United States Patent [19]

Sato

[11] Patent Number: 4,735,279
[45] Date of Patent: Apr. 5, 1988

[54] FOUR WHEEL DRIVE VEHICLE WITH ANTI-LOCK BRAKING SYSTEM AND ASSOCIATED METHODS

[75] Inventor: Makoto Sato, Wako, Japan

[73] Assignee: Honda Giken Kogyo Kabushiki Kaishi, Tokyo, Japan

[21] Appl. No.: 927,527

[22] Filed: Nov. 5, 1986

[30] Foreign Application Priority Data

Nov. 5, 1985 [JP] Japan .................. 60-247323
Nov. 5, 1985 [JP] Japan .................. 60-247324
Nov. 5, 1985 [JP] Japan .................. 60-247325

[51] Int. Cl.$^4$ .................. B60K 17/348; B60T 8/64
[52] U.S. Cl. .................. 180/244; 180/197; 180/248; 303/111
[58] Field of Search .......... 180/244, 248, 249, 250, 180/197; 303/111, 110, 119, 103, 106

[56] References Cited

U.S. PATENT DOCUMENTS 4,605,087  8/1986  Ashauer et al. .................. 180/248

FOREIGN PATENT DOCUMENTS 2215608  10/1973  Fed. Rep. of Germany ...... 303/111
2334235   2/1974  Fed. Rep. of Germany ...... 303/111
60-85052   5/1985  Japan .................. 303/111
60-143170  7/1985  Japan .................. 303/111

Primary Examiner—John J. Love
Assistant Examiner—Charles R. Watts
Attorney, Agent, or Firm—Roberts, Spiecens & Cohen

[57] ABSTRACT

A four wheel drive vehicle with an anti-lock braking system comprising front and rear axles coupled together by a power transmission assembly capable of transmitting the braking force acting upon the front wheels to the rear wheels. A power unit is drivingly connected to the power transmission assembly. A hydraulic braking system controls the hydraulic pressure applied to each wheel brake and an anti-lock control system controls the hydraulic braking pressure such that the braking pressure is reduced when a wheel is about to become locked. The anti-lock control system includes a front wheel control section to control the hydraulic pressure applied to the front wheel brakes and a rear wheel control section to control the hydraulic pressure applied to the rear wheel brakes. The front wheel and rear wheel control sections are connected so that in cases where the braking force acting upon the front wheels is transmitted to the rear wheels, i.e. in four wheel drive, the hydraulic braking pressure to the rear wheel brakes is reduced when the rear wheeels are about to be locked and the hydraulic pressure applied to the front wheel brakes has been reduced for at least a predetermined period of time.

14 Claims, 8 Drawing Sheets

FOUR WHEEL DRIVE VEHICLE WITH ANTI-LOCK BRAKING SYSTEM AND ASSOCIATED METHODS

BACKGROUND OF THE INVENTION (a) Field of the Invention

The present invention relates to a four wheel drive vehicle with an anti-lock braking system comprising front and rear axles coupled together by a power transmission assembly capable of transmitting a braking force acting upon the front wheels to the rear wheels, a power unit connected to the power tranmission assembly, and a hydraulic braking system for controlling the hydraulic pressure applied to a brake for each of the wheels, the hydraulic braking system including an anti-lock control device adapted to control the hydraulic braking pressure to reduce the same and prevent locking of the wheels.

(b) Description of the Prior Art

There has been a continuing development process with respect to improving various aspects of the characteristics and running performance of four wheel drive vehicles in travel on road surfaces which have a low coefficient of friction, and in addition, attempts have been made to equip such four wheel drive vehicles with anti-lock braking systems.

However, a number of problems occur in cases where an anti-lock braking system as used in a conventional two wheel drive vehicle is employed in a four wheel drive vehicle. Specifically, in a four wheel drive mode in which the braking force acting on the front wheels is transmitted to the rear wheels, interference occurs between the front and rear wheels, so that it is difficult to achieve a satisfactory anti-lock effect.

SUMMARY OF THE INVENTION

Accordingly, an object of the present invention is to provide a four wheel drive vehicle with an anti-lock braking system capable of efficiently and effectively carrying out anti-lock control of the front and rear wheels.

To this end, the present invention provides an anti-lock control device comprising a front wheel control section for controlling the front wheel brakes and a rear wheel control section for controlling the rear wheel brakes, the front wheel and rear wheel control sections being so constructed that, in a state wherein the front wheel braking force is transmitted to the rear wheels, a reduction in the hydraulic pressure applied to the front wheel brakes is sustained for at least a predetermined period and the hydraulic pressure applied to the rear wheel brakes is reduced solely when the rear wheels are just about to become locked.

With such a construction, while the braking force acting upon the front wheels is being transmitted to the rear wheels, the hydraulic pressure applied to the rear wheel brakes is reduced solely in cases where, for at least a predetermined period or longer, the front wheels maintain a state wherein they are just about to become locked with the rear wheels also being in the same state. In another case, since there is a tendency for interference between the front wheels and the rear wheels, it suffices to keep only the front wheels under anti-lock control and thus prevent locking of the rear wheels.

The above and other objects, features and advantages of the present invention will become apparent from the following description of preferred embodiments thereof, taken in conjunction with the accompanying drawings.

DESCRIPTION OF THE PREFERRED EMBODIMENTS

Preferred embodiments of this invention will be described with reference to the accompanying drawings.

Figure 1:
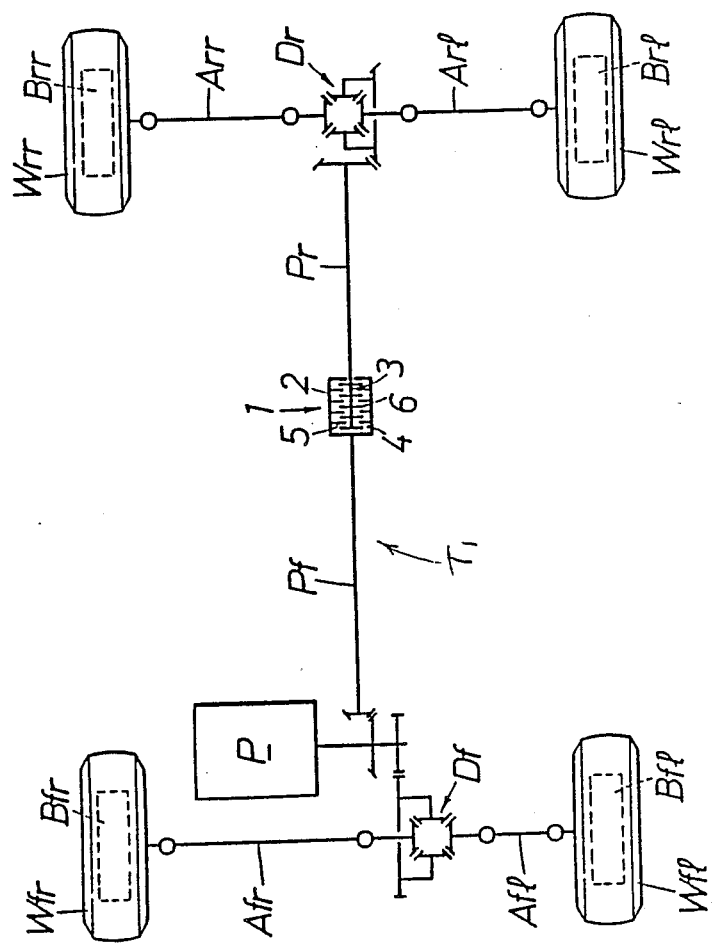
FIG. 1 is a schematic diagram of a drive system incorporating a first preferred embodiment of an anti-lock braking device in accordance with the present invention.

Referring first to FIG. 1 which schematically shows the first preferred embodiment of this invention, therein is seen a pair of right and left front wheels Wfr, Wfl and another pair of right and left rear wheels Wrr, Wrl supported at the front and rear portions of a vehicle body (not shown), respectively.

A pair of right and left front axles, Afr, Afl which are respectively connected to the right and left front wheels Wfr, Wfl are coupled together by a front differential gear Df, while a pair of right and left rear axles Arr, Arl which are respectively connected to the right and left rear wheels Wrr, Wrl are coupled together by a rear differential gear Dr. A power unit P including an engine (not shown) and transmission (not shown) is connected to an input of the front differential gear Df. The front differential gear Df and the rear differential gear Dr are coupled by a power transmission assembly $T_1$ including a front propeller shaft Pf connected to the front differential gear Df and the power unit P, a rear propeller shaft Pr connected to the rear differential gear Dr and a viscous clutch 1 disposed between the propeller shafts Pf and Pr.

The viscous clutch 1 includes an outer clutch member 2, in the form of a housing, and an inner clutch member 3, in the form of a rotatable shaft, which are capable of rotating with respect to each other. A closed oil chamber 4 is defined between the members 2 and 3 and chamber 4 is filled with a highly viscous oil and a small quantity of air to allow thermal expansion of the highly viscous oil. A plurality of outer clutch plates 5 are spline connected to the outer clutch member 2 and a plurality of inner clutch plates 6 are spline connected to the inner clutch member 3. The clutch plates 5 and 6 are disposed to be in alternating juxtaposed relation. The respective clutch plates 5 and 6 have openings (not shown) which allow the passage of the oil. The outer clutch member 2 and the inner clutch member 3 are integral with respective ends of the front propeller shaft Pf and the rear propeller shaft Pr.

In the viscous clutch 1, when a relative rotation occurs between the outer clutch member 2 and the inner clutch member 3, the clutch plates 5 and 6 are relatively rotated while shearing the highly viscous oil and torque is viscously transmitted between the clutch plates 5 and 6. When the velocity of the relative rotation further increases, a complicated temperature gradient is generated between the clutch plates 5 and 6 due to a rise in oil temperature. The synergistic effect of a distortion attributable to the temperature gradient and a pressure rise within the closed oil chamber 4 provides a partial frictional engagement or a substantially narrow gap between the adjacent clutch plates 5 and 6. As a result, the friction transmission of torque is effected between the outer clutch member 2 and the inner clutch member 3.

Such a viscous clutch 1 consistently provides substantially rigid connection of the front and rear propeller shafts Pf and Pr, that is, the front axles Afr, Afl and the rear axles Arr, Arl, and thus interference occurs between the front wheels Wfr, Wfl and the rear wheels Wrr, Wrl when braking force is applied to one or the other.

The front wheels Wfr, Wfl have brakes Bfr, Bfl, respectively while the rear wheels Wrr, Wfl have brakes Bf, Bfl of a relatively small capacity.

Figure 2:
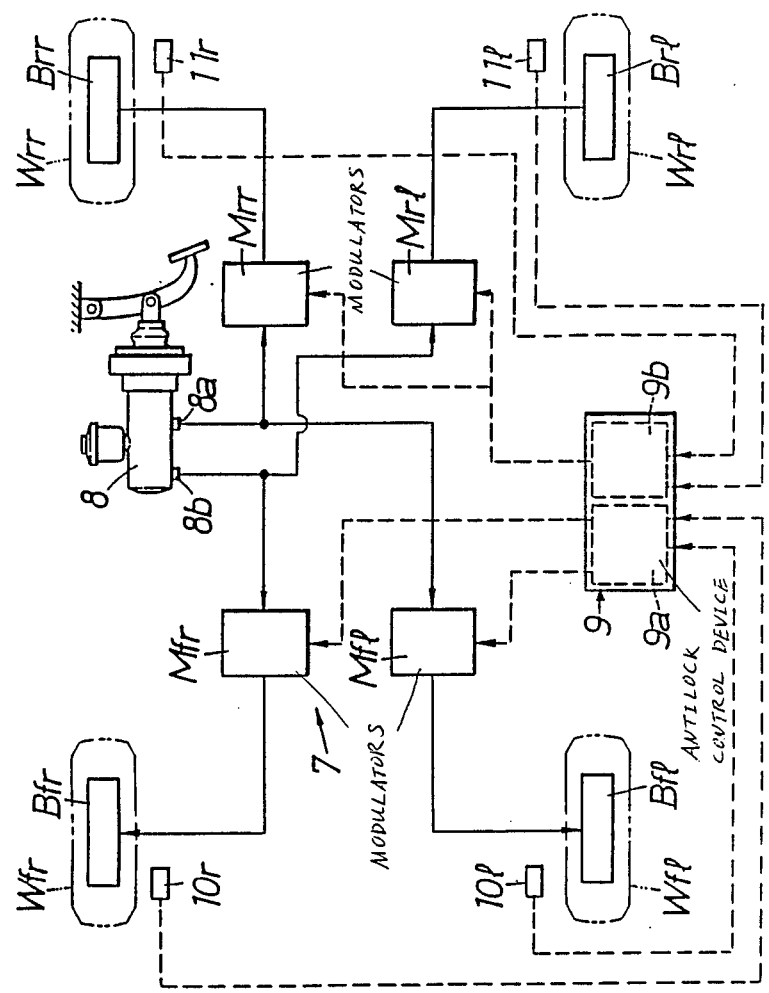
FIG. 2 is a schematic diagram of a braking system incorporating the first preferred embodiment of this invention.

Referring to FIG. 2, a hydraulic braking system 7 for controlling the hydraulic pressure of each of the brakes Bfr, Bfl, Brr and Bfl includes a tandem type master cylinder 8 having a pair of output ports 8a and 8b, modulators Mfr, Mfl arranged to regulate the hydraulic pressure supplied from the output port 8a, to transmit the thus regulated pressure to the left front wheel brake Bfl and the right rear wheel brake Brr, and modulators Mfr and Mrl arranged to regulate the hydraulic pressure supplied from the output port 8b, to transmit the thus regulated pressure to the right front wheel brake Bfr and the left rear wheel brake Brl. The hydraulic braking system 7 further includes an anti-lock control means 9 for controlling the operation of each of the modulators Mfr, Mfl, Mrr and Mrl, in order to prevent locking of the wheels.

The anti-lock control means 9 includes a front wheel control section 9a, arranged to individually control the modulators Mfr, Mfl for the front wheels Wfr, Wfl and a rear wheel control section 9b arranged to provide synchronous control of the modulators Mrr, Mrl for the rear wheels Wrr, Wrl. Detectors 10r and 10l respectively detect the wheel velocities of the front wheels Wfr, Wfl, and supply the detected signals to the front wheel control section 9a, while detectors 11r, 11l respectively detect the wheel velocities of the rear wheels Wrr, Wrl and supply the detected signals to the rear wheel control section 9b.

Figures 3, 4:
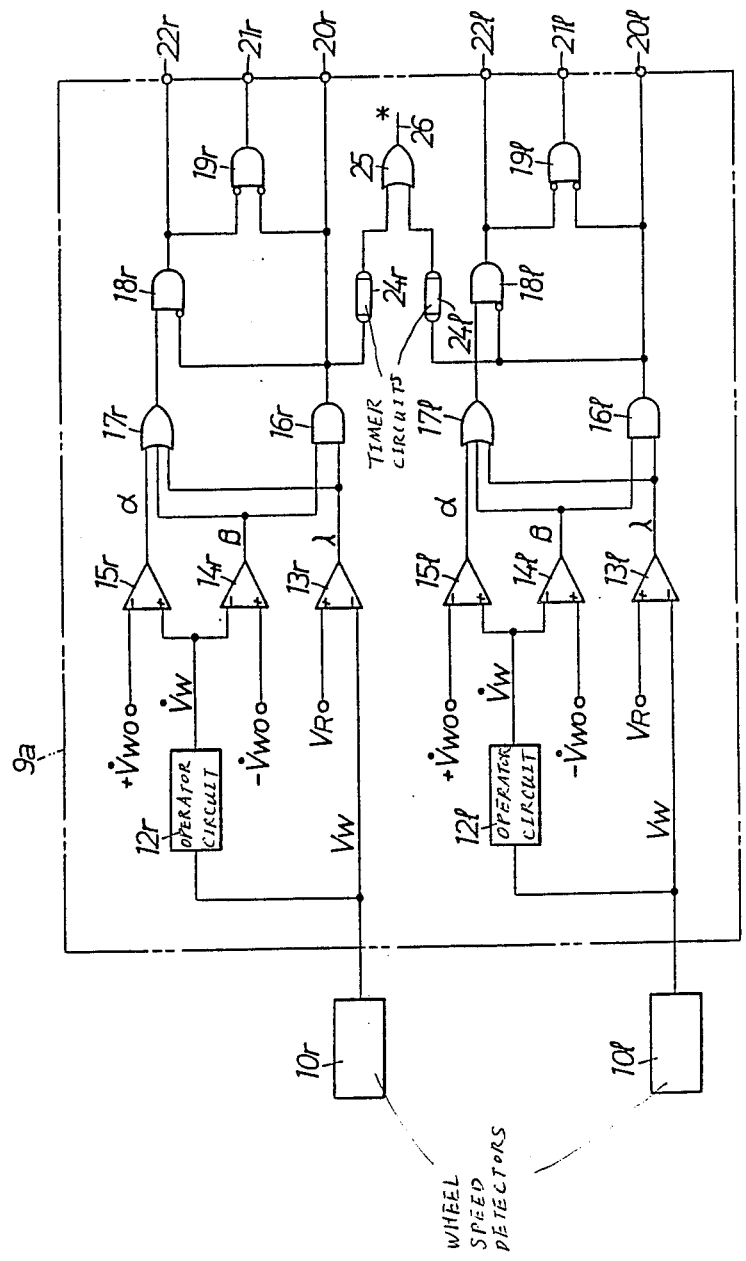
FIG. 3 is a circuit diagram of a front wheel control section constituting a part of the first preferred embodiment of this invention.
FIG. 4 graphically illustrates the waveforms of a timer circuit incorporated in the first preferred embodiment of this invention.

The construction of the front wheel control section 9a will be described below, with specific reference to FIG. 3. In the control section 9a parts corresponding to the modulator Mfl have basically the same construction as those of the parts corresponding to the modulators Mfr. Therefore, the following description will refer to the constituent elements relating to the modulators Mfl indicated by reference characters with suffix l, while the constituent elements relating to the modulator Mfr indicated by reference characters with suffix r are only illustrated and specific description will be omitted for the sake of simplicity.

In order to judge whether or not the wheels are at the point where they are just about to become locked, a wheel velocity $V_W$ detected by the detector 10l is fed to an inverted terminal of a first comparator 13l and at the same time to an operation circuit 12l which functions as a differentiator. Wheel acceleration $\dot{V}_W$ obtained by the operation circuit 12l is fed to an inverted terminal of a second comparator 14l and to a non-inverted terminal of a third comparator 15l. The first comparator 13l compares a reference wheel velocity $V_R$ and the wheel velocity $V_W$ and if, $V_R > V_W$, the first comparator 13l produces a signal $\frac{1}{2}$ indicative of a command to reduce braking oil pressure. The second comparator 14l compares reference wheel deceleration $-\dot{V}_{WO}$ and the wheel acceleration $\dot{V}_W$ and, if $-\dot{V}_{WO} > \dot{V}_W$, the second comparator 14l produces a signal $\beta$ indicative of a command to reduce braking oil pressure. Furthermore, the third comparator 15l compares a reference wheel acceleration $+\dot{V}_{WO}$ and the wheel acceleration $\dot{V}_W$ and, if $\dot{V}_W > +\dot{V}_{WO}$, the third comparator 15l produces a signal $\alpha$. The signal $\alpha$ is used to determine whether or not the wheel velocity $V_W$ is increasing, and, on the basis of the signal $\alpha$, whether the braking oil pressure is to be maintained.

The output terminal of the first comparator 13l is connected to an input terminal of an AND gate 16l and an input terminal of an OR gate 17l. The output terminal of the second comparator 14l is connected to input terminals of the AND gate 16l and the OR gate 17l. The output terminal of the third comparator 15l is connected to an input terminal of the OR gate 17l.

The output terminal of the AND gate 16l is connected to inverted input terminals of AND gates 18, 19l, and to an output terminal 20l. The output terminal of the OR gate 17l is connected to an input terminal of the AND gate 18l and the output terminal of the AND gate 18l is connected to an output terminal 22l and to inverted input terminal of the AND gate 19l.

The output terminal of the AND gate 19l is connected to an output terminal 21l.

In the front wheel control section 9a having the above described construction, a signal indicative of a command to reduce braking pressure is output at output terminal 20r and the output terminal 20l, a signal indicative of a command to increase braking pressure is output at output terminal 21r and the output terminal 21l, and a signal indicative of a command to maintain braking pressure at a constant level is output at output terminal 22r and the output terminal 22l. The modulator Mfl is actuated in response to the signals supplied from the output terminals 20l, 21l, and 22l, while the modulator Mfr is actuated in response to the signals supplied from the output terminals 20r, 21r and 22r, so that the anti-lock control of the brakes Bfl and Bfr is individually effected.

The output terminals of the AND gates 16r and 16l are also connected to the input terminals of timer circuits 24r and 24l. When a signal a shown in FIG. 4 is delivered to the circuits 24r and 24l, the circuits 24r and 24*l* produce a high level output signal having a waveform b which is delayed by a predetermined period T from the rise of the input signal a and which falls in response to the fall of the input signal a. The output terminals of the timer circuits 24*r* and 24*l* are connected to an OR gate 25.

When a signal indicative of a command to reduce the braking pressures applied to the brakes Bfr and Bfl is produced by the front-wheel control section 9*a* for the predetermined period T or longer, the timer circuits 24*r* and 24*l* act to cause the OR gate 25 to provide a high level output, and the signal output of the OR gate 25 is transmitted to the rear wheel control section 9*b* through a line 26.

Figure 5:
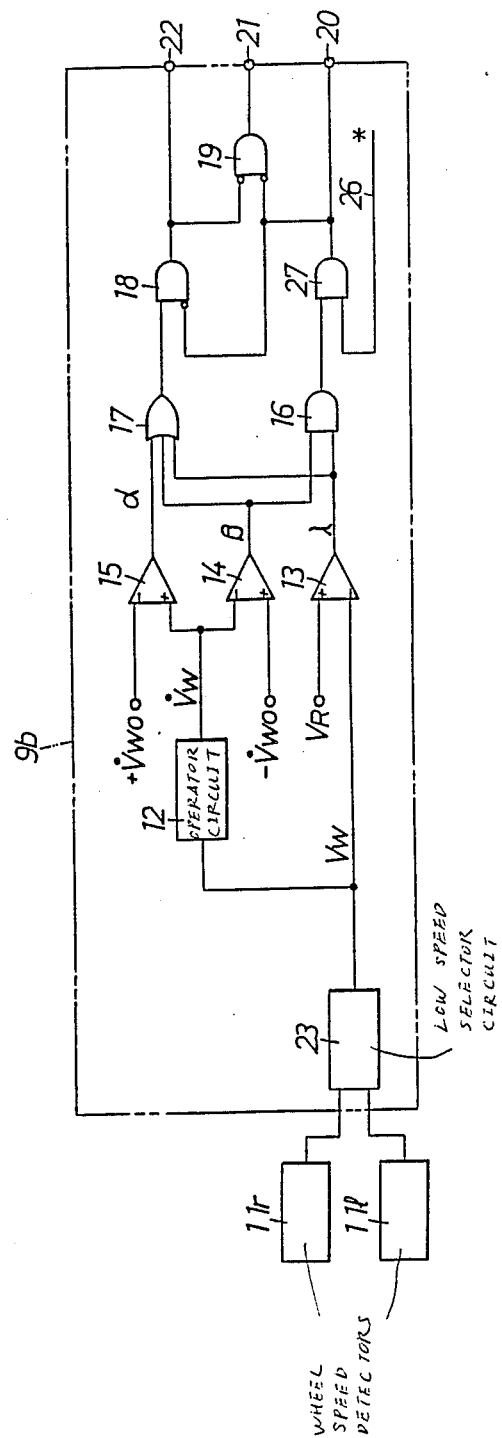
FIG. 5 is a circuit diagram of a rear wheel control section constituting a part of the first preferred embodiment of this invention.

The contruction of the rear wheel control section 9*b* will be described hereafter with reference to FIG. 5. However, since the construction of the front wheel control section 9*a* is similar to that of the rear wheel control section 9*a*, constituent elements corresponding to those in the front wheel control section 9*a* are represented by the same reference numerals without suffixes r, l and are merely illustrated.

It should be particularly noted that the wheel velocities detected by the detectors 11*r* and 11*l* are supplied to a low select circuit 23 where the lower wheel velocity is selected and a signal corresponding thereto is fed to comparator 13 and operation circuit 12. Specifically, anti-lock control is carried out on whichever of the right and left rear wheels Wrr and Wrl is more easily locked, namely, the wheel having the lower wheel velocity and the operations of the modulators Mrr and Mrl are synchronously controlled in response to the control signals at the output terminals 20, 21 and 22.

In addition, in the rear wheel control section 9*b*, the output terminal of the first comparator 13 is connected to an input terminal of an AND gate 27 while the line 26 is connected to the other input terminal of the AND gate 27. The output terminal of the AND gate 27 is connected to the output terminal 20 and to inverted input terminals of the AND gates 18 and 19.

Therefore, the rear wheel control section 9*b* provides for reduction in the hydraulic pressures applied to each brake of the rear wheels Wrr and Wrl if the front wheel control section 9*a* continues to reduce the hydraulic braking pressures of either of the front wheel brakes Bfr and Brl for the predetermined period T or longer.

The operation of the first preferred embodiment will be described below.

In a vehicle in which the front axles Afr, Afl and the rear axles Arr, Arl are substantially rigidly connected with each other, respectively, whenever the front wheels Wfr, Wfl are just about to become locked, the rear wheels Wrr, Wrl are also just about to become locked. In this case, the front wheel control section 9*a* is actuated to reduce the hydraulic braking pressure applied to the front wheels Wfr and Wrl to reduce the danger of locking of the front wheels Wfr, Wfl and the rear wheels Wrr, Wrl. In addition, since the brakes Bfr, Bfl of the front wheels Wfr, Wfl are individually controlled by the front wheel control section 9*a*, whichever of the front wheels Wfr and Wfl may be in danger of being locked is subjected to anti-lock control without any difficulty.

When the rear wheels Wrr, Wrl cannot be removed from the danger of being locked even by reducing the hydraulic braking pressure applied to the front wheels Wfr, Wfl, that is, when the rear wheels Wrr, Wrl cannot be removed from the danger of being locked even if a signal indicative of a command to reduce hydraulic braking pressure is sustained for the predetermined period T or longer in the front wheel control section 9*a*, the AND gate 27 provides a high level output in the rear wheel control section 9*b*. Accordingly, the hydraulic braking pressures applied to the rear brakes Brr, Brl are reduced, and thus the rear wheels Wrr, Wrl can be removed from the danger of being locked.

Also, when the rear wheels Wrr, Wrl alone are in danger of being locked, the wheels Wrr, Wrl are affected by the front wheels Wfr, Wfl and the danger of the rear wheels Wrr, Wrl being locked no longer increases. Hence, such a phenomenon may be ignored.

Figure 6:
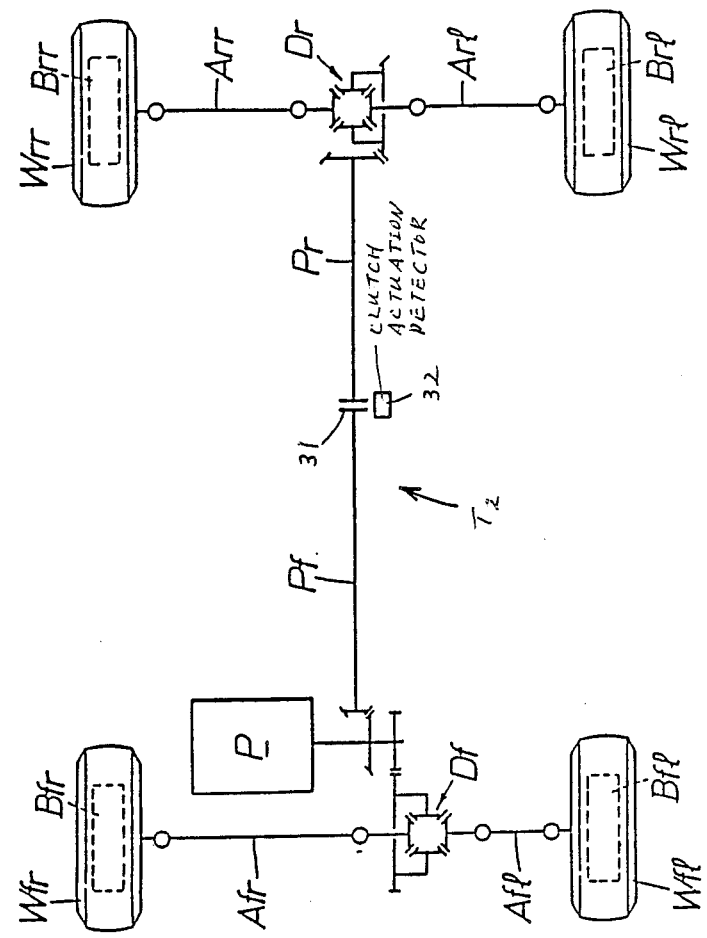
FIG. 6 is a schematic view similar to FIG. 1 but showing a drive system incorporating a second preferred embodiment of an anti-lock braking device in accordance with the present invention.
Figure 7:
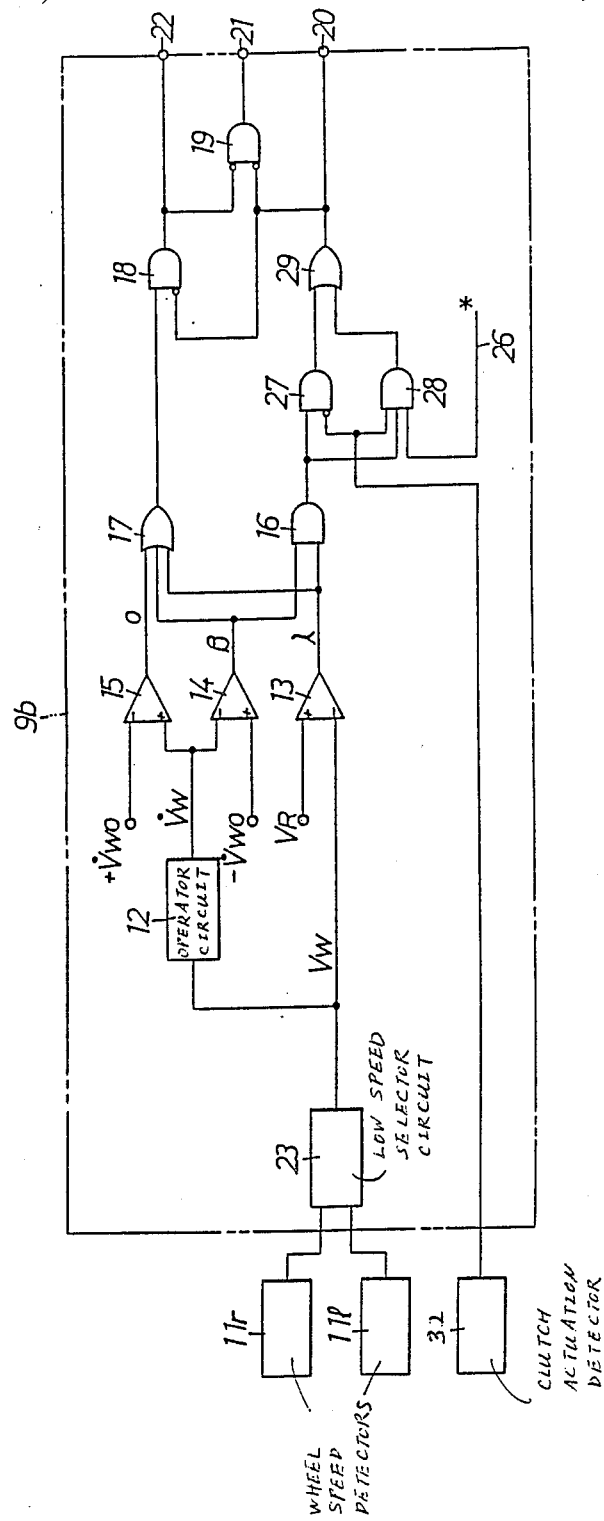
FIG. 7 is a circuit diagram of a rear wheel control section constituting a part of the second preferred embodiment of this invention.

FIGS. 6 and 7 respectively illustrate the second preferred embodiment of the present invention, in which, like reference numerals are used for the sake of simplicity to denote like or corresponding elements to those in the above-described first embodiment.

The power unit P is connected to the front differential gear Df, and the power unit P and the rear differential gear Dr are connected by a power transmission assembly T$_2$ which includes the front propeller shaft Pf, the rear propeller shafts Pr and a clutch 31 diposed between the propeller shafts Pf and Pr. The clutch 31 is capable of being manually switched between engaged and disengaged states, and the clutch 31 further includes an actuation detector 32.

In the four wheel drive vehicle incorporating the second embodiment, its braking system is constructed in the same manner as illustrated in FIG. 2 and the anti-lock control device is constructed in a manner basically analogous to that of the first embodiment. However, as shown in FIG. 7, in the rear wheel control section 9*b* of the anti-lock control device, the output terminal of the AND gate 16 is connected to input terminals of AND gates 27 and 28, and the actuation detector 32 is connected to an input terminal of the AND gate 28 and to an inverted input terminal of the AND gate 27. The line 26 coming from the front wheel control section 9*a* is connected to an input terminal of the AND gate 28, and the output terminals of the AND gates 27, 28 are connected to the respective input terminals of the OR gate 29. The output terminal of the OR gate 29 is connected to the output terminal 20 and to inverted input terminals of the AND gates 18, 19.

Therefore, the rear wheel control section 9*b* provides a reduction in the hydraulic braking pressure applied to the rear wheels Wrr and Wrl if the front wheel control section 9*a* continues to reduce the hydraulic braking pressure applied to either of the front wheel brakes Bfr and Brl for the predetermined period T or longer.

The operation of the second preferred embodiment will be described below.

When the clutch 31 is engaged, whenever the front wheels Wfr, Wfl are just about to become locked, the rear wheels Wrr, Wrl are also just about to become locked. In this case, the front wheel control section 9*a* is actuated to reduce the hydraulic pressure applied to each brake of the front wheels Wfr and Wfl, whereby it is possible to reduce the danger of locking of the front wheels Wfr, Wfl and of the rear wheels Wrr, Wrl. In addition, when the brakes Bfr, Bfl of the front wheels Wfr, Wfl are individually controlled by the front wheel control section 9*a*, whichever of the front wheels Wfr and Wfl may be in danger of being locked is subjected to anti-lock control without any difficulty.

When the rear wheels Wfr, Wfl cannot be removed from the danger of being locked even by reducing the hydraulic braking pressure applied to the front wheels Wfr, Wfl, that is, when the rear wheels Wfr, Wfl cannot be removed from the danger of being locked even if the signal indicative of a command to reduce hydraulic braking pressure is sustained for the predetermined period T or longer in the front wheel control section 9a, the AND gate 28 provides a high level output in the rear wheel control section 9b. Accordingly, the hydraulic braking pressures applied to the rear brakes Brr, Brl are reduced, and thus the rear wheels Wrr, Wrl are removed from the danger of being locked.

When the rear wheels Wrr, Wrl alone are in danger of being locked, the wheels Wrr, Wrl are affected by the front wheels Wfr, Wfl and the danger of locking of the rear wheels Wrr, Wrl no longer increases. Hence, such a phenomenon may be ignored.

Figure 8:
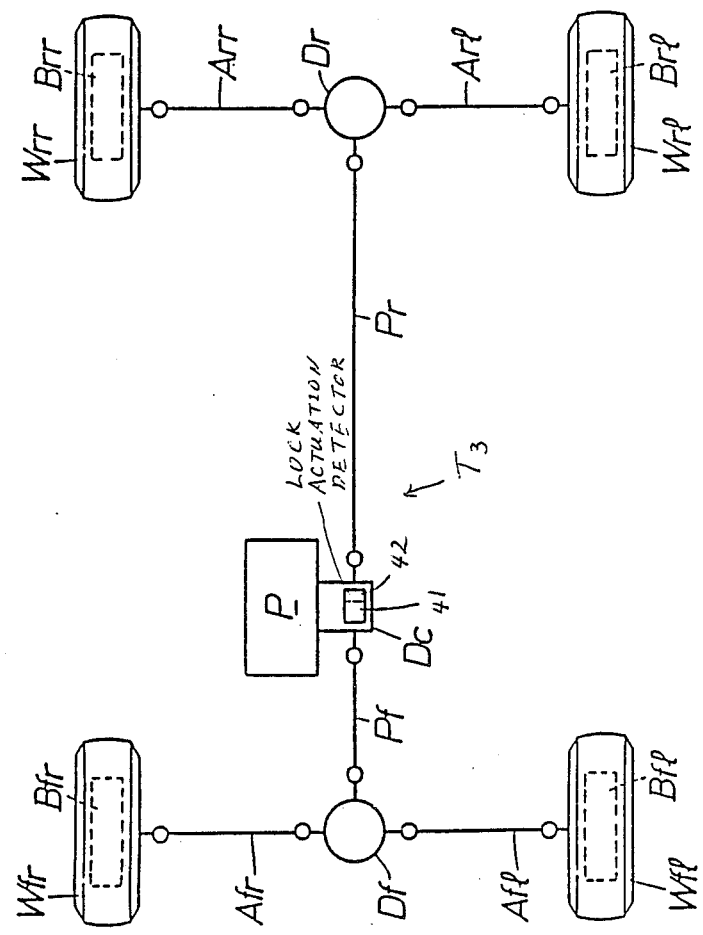
FIG. 8 is a schematic diagram similar to FIG. 1 but showing a drive system incorporating a third preferred embodiment of an anti-lock braking device in accordance with the present invention.
Figure 9:
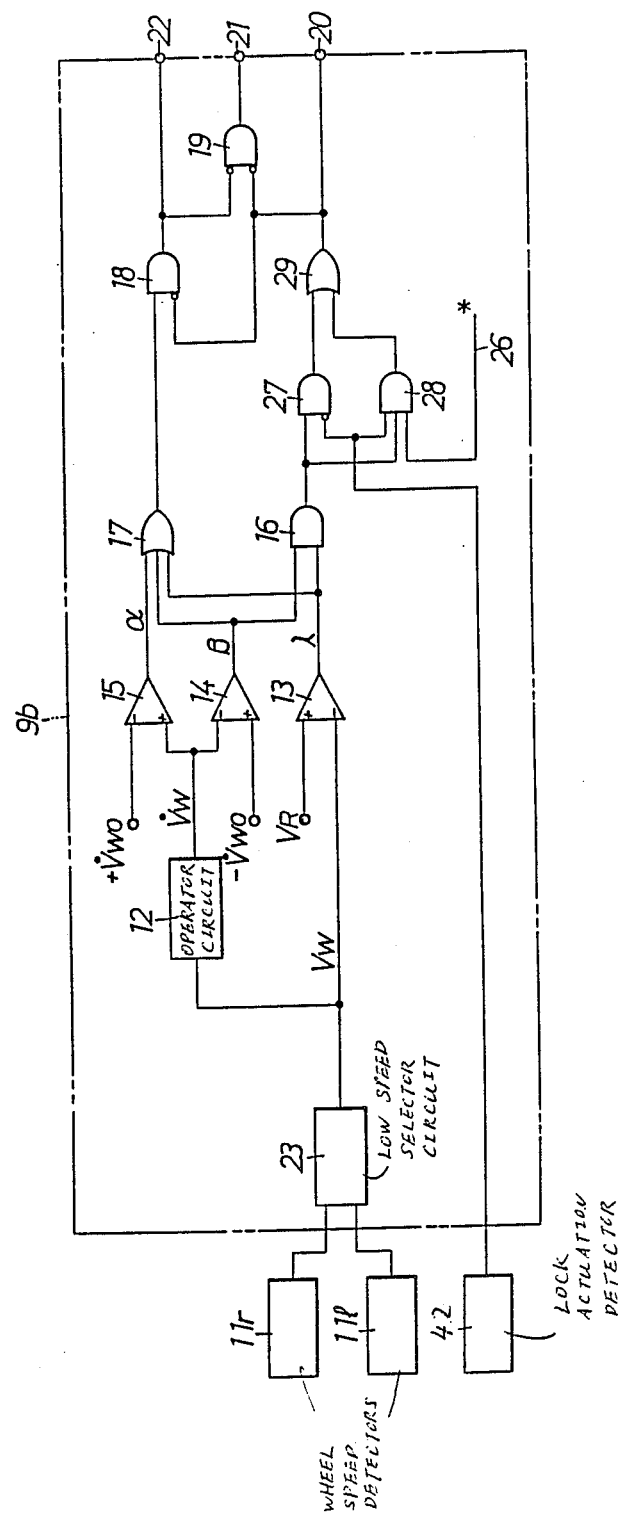
FIG. 9 is a circuit diagram of a rear wheel control section constituting a part of the third preferred embodiment of this invention.

FIGS. 8 and 9 respectively illustrate the third preferred embodiment of the present invention, in which, like reference numerals are used for the sake of simplicity to denote like or corresponding elements relative to those in the above described first and second embodiments.

The front differential gear Df and the rear differential gear Dr are coupled together by a power transmission assembly T3 which includes the front propeller shaft Pf, the rear propeller shaft Pr and a center differential gear Dc disposed between the propeller shafts Pf and Pr. The power unit P is connected to an input of the center differential gear Dc.

The center differential gear Dc includes a lock mechanism 41, and, when the lock mechanism 41 is actuated, the vehicle is set in a four wheel drive mode in which the front and rear propeller shafts Pf, Pr are directly coupled together. The operation of the lock mechanism 41 is detected by an actuation detector 42.

In a vehicle incorporating the third preferred embodiment, although the braking system and the antilock control device are constructed in the same manner as those of the second embodiment, the actuation detector 42 delivers a signal to the rear wheel control section 9b, as shown in FIG. 9.

It will be appreciated that the third embodiment can provide the same effect as that of the second embodiment.

While the invention has been described in relation to specific embodiments thereof, it would be apparent to those skilled in the art that numerous modifications and variations can be made within the scope and spirit of the invention as defined in the attached claims.

What is claimed is:

1. A four wheel drive vehicle with an anti-lock braking system comprising:
   front and rear axles, each axle having left and right wheels thereon with respective brakes therefor;
   a power transmission assembly coupling said axles together and capable of transmitting a braking force acting upon the front wheels to the rear wheels;
   a power unit drivingly connected to said power transmission assembly;
   a hydraulic braking system coupled to said brakes for controlling hydraulic pressure applied to each brake; and
   an anti-lock control means for controlling hydraulic braking pressure to reduce the braking pressure when a wheel is just about to become locked;
   said anti-lock control means including a front wheel control section for controlling the hydraulic pressure applied to the front wheel brakes and a rear wheel control section for controlling the hydraulic pressure applied to the rear wheel brakes;
   said front wheel and rear wheel control sections including means for controlling braking pressure such that braking pressure is reduced to said rear wheel brakes when the rear wheels are about to be locked provided that braking pressure to said front wheel brakes has been reduced for at least a predetermined time by said front wheel control section.

2. A four wheel drive vehicle with an anti-lock braking system as claimed in claim 1 wherein said front wheel control section includes an output terminal and means for producing a first signal at said output terminal to reduce braking pressure to a front wheel brake when the wheel is about to be locked, said means for controlling braking pressure comprising means including a timer circuit for supplying said signal from the front wheel control section to said rear wheel control section.

3. A four wheel drive vehicle with an anti-lock braking system as claimed in claim 2 wherein said rear wheel control section includes an output terminal and means for producing a signal at said output terminal of the rear wheel control section to provide an output to reduce braking pressure to a rear wheel brake, means for producing a third signal when a rear wheel is about to be locked, said second signal producing means producing said second signal provided said first and third signals are produced.

4. A four wheel drive vehicle with an anti-lock braking system as claimed in claim 3 wherein said means for producing said second signal comprises an AND gate.

5. A four wheel drive vehicle with an anti-lock braking system as claimed in claim 4 wherein said AND gate has input terminals to which said first and third signals are supplied and an output terminal connected to said output terminal of said rear wheel control section.

6. A four wheel drive vehicle with an anti-lock braking system as claimed in claim 1, wherein said power transmission assembly includes front and rear propeller shafts drivingly coupled to said axles respectively, and a torque transmission drivingly coupling said front and rear propeller shafts for transmitting greater torque therebetween as relative rotational velocity therebetween increases, said front wheel control section including means for individually controlling the front wheel brakes.

7. A four wheel drive vehicle with an anti-lock braking system as claimed in claim 6 wherein said front wheel control section includes an output terminal at which a first signal is produced to reduce braking pressure to a front wheel brake when the wheel is about to be locked, said means for controlling braking pressure comprising means including a timer circuit for supplying said signal from the front wheel control section to said rear wheel control section, said rear wheel control section including an output terminal at which a second signal is produced to reduce braking pressure to a rear wheel brake, means for producing a third signal when a rear wheel is about to be locked, and an AND gate having input terminals for said fitst and third signals and an output connected to the output terminal of said rear wheel section.

8. A four wheel drive vehicle with an anti-lock braking system as claimed in claim 1, wherein said power transmission assembly includes a clutch capable of being manually engaged and disengaged.

9. A four wheel drive vehicle with an anti-lock braking system as claimed in claim 8 comprising a detector for detecting whether the clutch is engaged or disengaged, said rear wheel control section including an output terminal at which a second signal is produced to reduce braking pressure to a rear wheel brake, means for producing a third signal when a rear wheel is about to be locked, and an AND gate having input terminals for said first and third signals and for a further signal indicating when said clutch is engaged, said AND gate having an output terminal coupled to the output terminal of said rear wheel control section.

10. A four wheel drive vehicle with an anti-lock braking system as claimed in claim 1, wherein said power transmission assembly includes a differential gear having a lock mechanism for selectively connecting the front and rear axles in four wheel drive relation.

11. A four wheel drive vehicle with an anti-lock braking system as claimed in claim 10 comprising a detector for detecting whether the lock mechanism is operative or inoperative, said rear wheel control section including an output terminal at which a second signal is produced to reduce braking pressure to a rear wheel brake, means for producing a third signal when a rear wheel is about to be locked, and an AND gate having input terminals for said first and third signals and for a further signal indicating when said lock mechanism is operative, said AND gate having an output terminal coupled to the output terminal of said rear wheel control section.

12. A method of providing an anti-lock brake action on the brakes of front and rear wheels mounted on front and rear axles of a four wheel vehicle having a power unit drivingly connected by a power transmission assembly to the axles, said method comprising:

applying hydraulic braking pressure to the brakes during a braking operation;

sensing conditions of the wheels to determine when a wheel is about to become locked;

controlling, by a front wheel control section, the braking pressure applied to the front wheel brakes to reduce the braking pressure to a front wheel which is about to be locked;

separately controlling, by a rear wheel control section, the braking pressure applied to the rear wheel brakes to reduce the braking pressure to a rear wheel which is about to be locked, and feeding an output signal from the front wheel control section to the rear wheel control section so that braking pressure to the brakes of the rear wheels is reduced only after the pressure to the front wheel brakes has been reduced for at least a predetermined period of time by said front wheel control section.

13. A method as claimed in claim 12 comprising detecting the speed of rotation of the left and right rear wheels, determining which of the rear wheels is about to be locked based on the slower rotating wheel, and synchronously controlling both rear wheels on the basis of the slower rotating wheel.

14. A method as claimed in claim 13 wherein said power transmission assembly is capable of being engaged and disengaged, said method further comprising sensing the engaged condition of said power transmission assembly and effecting the reduction of the braking pressure to the rear wheel brakes after said predetermined period of time only when said power transmission assembly is engaged.

* * * * *

UNITED STATES PATENT AND TRADEMARK OFFICE
CERTIFICATE OF CORRECTION

PATENT NO. : 4,735,279
DATED : April 5, 1988
INVENTOR(S) : Sato

It is certified that error appears in the above—identified patent and that said Letters Patent is hereby corrected as shown below:

On the title page

The name of the assignee should read:
-- Honda Giken Kogyo Kabushiki Kaisha --.

Signed and Sealed this

Fourteenth Day of February, 1989

Attest:

DONALD J. QUIGG

*Attesting Officer*  *Commissioner of Patents and Trademarks*